United States Patent Office 3,629,228
Patented Dec. 21, 1971

3,629,228
NON-CORROSIVE SILOXANE VULCANIZABLE
AT ROOM TEMPERATURE
Robert C. Hartlein, Midland, and Carl R. Olson, Freeland,
Mich., assignors to Dow Corning Corporation, Midland, Mich.
No Drawing. Filed Dec. 1, 1969, Ser. No. 881,290
Int. Cl. C08k 1/66
U.S. Cl. 260—185       6 Claims

ABSTRACT OF THE DISCLOSURE

A room temperature vulcanizable alkoxy siloxane block copolymer of a polydiorganosiloxane block and a monoorganosiloxane block being endblocked with monoorganodialkoxysiloxy units is non-corrosive toward metals and is useful when cured as a direct resistant coating.

---

This invention relates to a room temperature vulcanizable organosiloxane composition which is a block copolymer.

Alkoxy functional silanes and siloxanes are well known in the art. The alkoxy silanes are known as being useful in cross-linking polymers in the production of room temperature vulcanizable silicone rubber and alkoxy siloxanes are known as room temperature vulcanizable silicone rubber.

It is quite unexpected that an alkoxy siloxane would cure to provide a strong resinous material which is non-corrosive toward metals with a resistance to dirt pick-up in the cured state, compared to other silicone compositions which cure at room temperature. It is therefore an object of this invention to provide an alkoxy siloxane vulcanizable at room temperature to a dirt resistant product.

This invention relates to a room temperature vulcanizable composition stable in the absence of moisture and curable upon exposure to moisture consisting essentially of an alkoxy functional organosiloxane block copolymer consisting essentially of (A) 24 to 84 inclusive mol percent of diorganosiloxane units wherein the diorganosiloxane units are bonded through silicon-oxygen-silicon bonds forming a polydiorganosiloxane block having an average of from 15 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmenthylsiloxane units and monomethylsiloxane units, (B) 11 to 68 inclusive mol percent organosiloxane units having an average formula

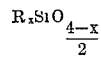

where $x$ has a value of from 1 to 1.3 inclusive and R is an organic group selected from the group consisting of aryl radicals, methyl radicals, vinyl radicals, ethyl radicals and propyl radicals, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 2 to 27 inclusive mol percent of endblocking alkoxysiloxane units of the formula

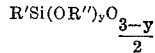

where $y$ has an average value from 1.8 to 2 inclusive, R′ is an organic radical selected from the group consisting of alkyl radicals having from 1 to 5 inclusive carbon atoms, phenyl radicals and vinyl radicals, and each R″ is an alkyl radical of from 1 to 5 inclusive carbon atoms, the mol percentage of (A), (B) and (C) being based on the total number of siloxane units in the organosiloxane block copolymer.

The room temperature vulcanizable composition of the present invention can be prepared by several methods. The best method is to couple a hydroxyl terminated polydiorganosiloxane with an aromatic containing organosiloxane resin having hydroxyl groups by reaction with a trifunctional organosilane. The resulting block copolymer is hydroxylated and this block copolymer is then reacted with monoorganotrialkoxysilane to yield the room temperature vulcanizable composition. Alternatively the hydoxyl terminated polydiorganosiloxane can be cohydrolyzed with a trifunctional organosilane in the proper proportions. In the methods for making the room temperature vulcanizable composition of the present invention, conditions which cause siloxane bond rearrangement should be avoided.

The preparations of the room temperature vulcanizable compositions of the present invention begin with a polydiorganosiloxane which is terminated by hydroxyl radicals or hydrolyzable groups. The polydiorganosiloxanes suitable for the present invention have an average of from 15 to 350 diorganosiloxane units per molecule, preferably from 25 to 100 diorganosiloxane units per molecule. The polydiorganosiloxanes are at least 80 mol percent dimethylsiloxane units. Any remaining siloxane units can be phenylmethylsiloxane units or monomethylsiloxane units. The polydiorganosiloxanes preferably are all dimethylsiloxane units. The phenylmethylsiloxane units or the monomethylsiloxane units are present in amounts of 10 mol percent or less each. Preferably, the monoorganosiloxane is absent or present in small amounts, such as less than 2 mol percent. The terminating groups for the polydiorganosiloxanes can be hydroxyl radicals or any hydrolyzable group. Examples of hydrolyzable groups include halogen such as chlorine, alkoxy such as methoxy and ethoxy, acyloxy such as acetoxy, ketoxime such as methylethylketoxime and the like.

The polydiorganosiloxanes are employed in the preparation to provide the final room temperature vulcanizable composition with from 24 to 84 mol percent diorganosiloxane units derived from the polydiorganosiloxane, preferably from 37 to 65 mol percent. The mol percent of diorganosiloxane units includes any quantity of monomethylsiloxane units or phenylmethysiloxane units in the polydiorganosiloxane. The polydiorganosiloxane forms one of the blocks of the block copolymer of the present invention. Since siloxane bond rearrangement conditions are avoided in the preparation of the room temperature vulcanizable composition of the present invention, the polydiorganosiloxanes essentially retain their original composition except for the terminating functional groups, as illustrated by the hydroxyl radicals and hydrolyzable groups. The polydiorganosiloxanes are well known in the art and can be obtained commercially.

The other block of the block copolymer of the present invention can be represented by an average unit formula

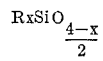

where R is an aryl radical, methyl, ethyl, vinyl or propyl and $x$ has an average value of from 1 to 1.3. Any aryl radical is suitable for the present invention and include for example such species as phenyl, tolyl, xylyl, xenyl, naphythyl and anthracyl. The organic radicals which are represented in the formula by R, are at least 50 percent aryl and preferably at least 80 percent of the organic radicals are aryl. The organosiloxane units of (B) can all be in the same, aryl, or can be mixtures of various organosiloxane units, however, the organosiloxane units are monoorganosiloxane units or diorganosiloxane units. Illustrative examples of the organosiloxane units in (B) are monoorganosiloxane units such as phenylsiloxane, tolylsiloxane, xylylsiloxane, xenylsiloxane, naphthylsiloxane, methylsiloxane, ethylsiloxane, vinylsiloxane, and propylsiloxane and diorganosiloxane units such as dimethylsiloxane, diethylsiloxane, diphenylsiloxane, dinaphthylsiloxane, methylphenylsiloxane, methylethylsiloxane, methylpropylsiloxane, methylvinylsiloxane, methyltolylsiloxane, methylnaphthylsiloxane, ethylphenylsiloxane, propyltolylsiloxane, ethylpropylsiloxane and methylxenylsiloxane. Small amounts of other siloxane units, such as triorganosiloxane units and $SiO_2$ units, as well as, monoorganosiloxane units and diorganosiloxane units with other organic groups can be tolerated up to amounts of 1 or 2 mol percent without departing from the present invention.

The organosiloxane units of block (B) are present in amounts sufficient to provide the room temperature vulcanizable composition of the present invention with from 11 to 68 mol percent organosiloxane units, preferably from 25 to 52 mol percent.

Block (B) consists of at least 3 organosiloxane units per block. The average size of polymer block (B) is dependent upon the method of preparation and also dependent upon the average size of the polydiorganosiloxane blocks of (A) and the mol percentage of organosiloxane units of (B).

The endblocking alkoxysiloxane units of (C) are represented by the average unit formula

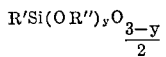

where $y$ has an average value of from 1.8 to 2 inclusive, R' is an organic radical selected from alkyl radicals having from 1 to 5 inclusive carbon atoms, phenyl radicals and vinyl radicals and R" is an alkyl radical having from 1 to 5 inclusive carbon atoms. The alkyl radicals include both straight and branched radicals, such as methyl, ethyl, propyl, isopropyl, butyl and pentyl. The endblocking alkoxysiloxane units can be illustrated by methyldimethoxysiloxane, ethyldimethoxysiloxane, methyldiethoxysiloxane, methylethoxyomethoxysiloxane, propyldiisopropoxysiloxane, propyldimethoxysilane, butyldimethoxysiloxane, pentyldimethoxysiloxane, methyldipentoxysiloxane, methylmonomethoxysiloxane, ethylmonomethoxysiloxane, phenyldimethoxysiloxane, phenyldiethoxysiloxane, vinyldimethoxysiloxane, vinyldiisopropoxysiloxane, vinyldiethoxysiloxane, propylmonoethoxysiloxane, phenylmonobutoxysiloxane, butylmonomethoxysiloxane, vinylmonopropoxysiloxane and pentylmonomethoxysiloxane. The endblocking alkoxysiloxane units are essentially all monoorganodialkoxysiloxane units with the exception that some of the endblocking alkoxysilanes used in the preparation can react with, for example, two hydroxyl radicals and thus small amounts of monoorganomonoalkoxysiloxane units can be present. The endblocking alkoxysiloxane units are present in amounts sufficient to provide the room temperature vulcanizable composition with from 2 to 27 inclusive mol percent based on the total number of siloxane units in the organosiloxane block copolymer. Preferably from 2 to 25 inclusive mol percent of the endblocking alkoxysiloxane units are present.

In the preparation of the room temperature vulcanizable composition of the present invention a block copolymer is first prepared consisting essentially of the blocks described in (A) and (B). There are a number of methods known for the preparation of the block copolymer described by (A) and (B). The best method for preparing the block copolymer is to react under anhydrous conditions a hydroxyl terminated polydiorganosiloxane with a trifunctional silane, such as, methyltriacetoxysilane, phenyltriacetoxysilane, vinyltriacetoxysilane, methyltri(methylethylketoxime)silane, phenyltrimethoxysilane, methyltriethoxysilane and the like. Sufficient trifunctional silane is added to provide one mole of silane per mole of hydroxyl of the polydiorganosiloxane. The reaction product is a monoorgano difunctional siloxy endblocked polydiorganosiloxane. The monoorganodiketoxime siloxy endblocked polydiorganosiloxanes are further described in U.S. Pat. No. 3,184,427 and U.S. Pat. No. 3,189,576 which are hereby incorporated by reference. The monoorganodiacetoxysiloxy endblocked polydiorganosiloxanes are further described in U.S. Pat. No. 3,035,016 which is hereby incorporated by reference. The monoorganodialkoxysiloxy endblocking polydiorganosiloxanes are further described in U.S. Pat. No. 3,161,614 and U.S. Pat. No. 3,170,894 which are hereby incorporated by reference.

The monoorgano difunctional siloxy endblocked polydiorganosiloxane is then coupled to a hydroxylated organosiloxane which falls within the scope defined in (B). The coupling can take place in the presence of suitable catalyst for such reactions as described in the patents cited above. The resulting product is a hydroxylated organosiloxane block copolymer having from 0.5 to 5 inclusive weight percent hydroxyl radicals, preferably from 1 to 4.5 inclusive weight percent hydroxyl radicals.

In those cases in which a ketoxime or acetoxy functional silane is used to endblock the hydroxyl terminated polydiorganosiloxane, and a hydroxylated organosiloxane block copolymer is then prepared, with water or neutralizing solution, it is preferred to either wash the hydroxylated organosiloxane block copolymer or distill out of the final alkoxy functional organisiloxane block copolymer the by-product oxime or acetic acid to insure a maximum non-corrosive property where such a property is required, as in the case where the application is with metals such as copper.

The hydroxylated organosiloxane block copolymer is then endblocked with monoorganotrialkoxysilanes, such as methyltrimethoxysilane, ethyltrimethoxysilane, propyltrimethoxysilane, butyltrimethoxysilane, phenyltrimethoxysilane, pentyltrimethoxysilane, vinyltrimethoxysilane, methyltriethoxysilane, ethyltriethoxysilane, phenyltriethoxysilane, butyltripropoxysilane, pentyltriisopropoxysilane, vinyltributoxysilane, vinyltripentoxysilane, methyltripentoxysilane, ethyltributoxysilane, methyldimethoxyethoxysilane, methyldiethoxymethoxysilane, ethyldiethoxymethoxysilane and phenyltripropoxysilane. Mixtures of two or more monoorganotrialkoxysilanes can be used. The final step should be carried out under anhydrous conditions. The resulting product is the room temperature vulcanizable composition of the present invention.

In any of the processes described above the reactions are preferably carried out in the presence of organic solvents and at temperatures ranging from below room temperature to the boiling point of the mixture. The reactions are carried out at temperatures from −30° C. to 130° C., preferably 20° C. to 100° C.

The processes described herein are carried out under essentially anhydrous conditions unless otherwise stated. The compositions containing the hydrolyzable groups can be stored under anhydrous conditions for extended periods of time without appreciable change in compositions or properties both in the uncured or cured state.

The best method for carrying out a reaction between the monoorganotrialkoxysilane and the hydroxylated organosiloxane block copolymer is to add separately to the mixture thereof an organotitanate and an organoamine at a temperature from 0° C. to 100° C. and preferably in an organic solvent. The organic solvents and any by-products, such as the by-produced alcohols are stripped from the alkoxysiloxane block copolymer product. The organotitanates can be any of the well-known organotitanates such as tetraethyltitanate, tetraisopropyl titanate, tetra-n-butyl titanate, tetra-2-ethylhexyl titanate, tetraphenyl titanate, tetraoctadecyl titanate, tetra-12-octadecenyl titanate, triethanolamine titanate

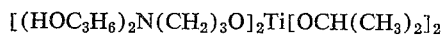

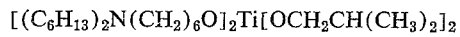

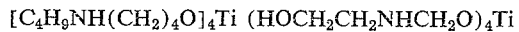

tetrakistriethanolamine titanate-N-stearate, ethylene glycol titanate,

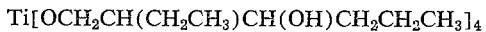

tetra(methylcellosolve titanate, bis(acetylacetonyl)diisopropyl titanate,

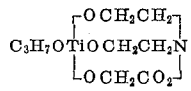

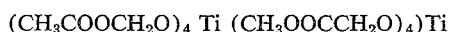

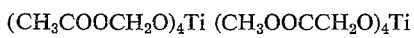

and diisopropyldiacetoxy titanate.

In addition, solvent-soluble partial hydroylzates of any of the above titanates can be employed and, in addition, part or all of the organoxy radicals can be replaced by $Z_3SiO-$ radicals wherein Z is a monovalent organic radical.

The organoamine can be a primary amine, a secondary amine or a tertiary amine. The amine can contain one or more amino groups and can also contain carbon-bonded silicon atoms and other functional organic groups which are free of active hydrogen.

Specific examples of operative amines are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis-gamma-aminopropyltetramethyldisoloxane, gamma(N-aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di - m - tolylamine, beta-ethoxyethylamine, tetrahydrofurfurylamine, tetramethylguanidine, histamine, benzylhydrazine, p-bromophenylhydrazine, 1-methyl - 1 - phenylhydrazine, 4,4-diaminohydrazobenzene, $p_3$-leucaniline, methylamine, morpholine, n-hexylamine, 5-nitronaphthylamine, 1,2-dimethyl-4-pentenylamine, N,N-diethyl-p-phenylenediamine, piperazine, piperidine, butylamine, 2-aminopyridine, 6-nitro-o-toluidine, 2-amino-p-tolunitrile, 9-phenanthrylamine, and tribenzylamine.

It is preferred that the organoamine and the organotitanate not be added at the same time. Either the organoamine is added and then the organotitanate is added after a lapse of a defined period of time of at least ten seconds, preferably 5 to 15 minutes or the organotitanate is added first and then the organoamine is added after a lapse of a defined period of time. The organotitanate is preferably added first. The temperatures are not narrowly critical as stated above, preferably the temperatures range from room temperature to 95° C.

Organic solvents suitable for use in the process include hydrocarbons such as cyclohexane, methylcyclopentane, benzene, toluene and xylene; halocarbons and halohydrocarbons such as perchloroethylene and chlorobenzene; ethers such as diethyl ether and methylamyl ether; halogenated ethers such as 2,2'-dibromodiethyl ether; esters such as butyl acetate and other solvents such as tetrahydrofuran, acetonitrile, ethylene glycol dimethyl ether and dimethylsulfoxide.

The room temperature vulcanizable compositions can be prepared by reacting under anhydrous conditions a hydroylated organosiloxane block copolymer within the limits set forth in (A) and (B) with a monoorganotiralkoxysilane of the formula $R_2Si(OR'')_2$ where R' and R'' are defined above. The hydroxylated organosiloxane block copolymer would have the following composition. A polydiorganosiloxane block as defined in (A) is present in an amount of from 26.1 to 88.4 mol percent, the organosiloxane block defined in (B) is present in an amount of from 11.6 to 74.9 mol percent and the hydroxylated organosiloxane block copolymer has from 0.5 to 5 weight percent silicon-bonded hydroxyl radicals. The amount of monoorganotrialkoxysilane reacted with the hydroxylated organosiloxane block copolymer is sufficient to provide from 2 to 27 mol percent based on the total number of siloxane units in the resulting product and sufficient enough to provide at least one molecule of monoorganotrialkoxysilane per hydroxyl radical in the hydroxylated organosiloxane block copolymer.

The hydroxylated organosiloxane block copolymers suitable for use in the present invention are known in the art and can be prepared by a number of methods. Additional details for the preparation of the hydroxylated organosiloxane block copolymers can be found in U.S. Pats. Nos. 3,280,214, 3,294,718, 3,328,481 and 3,436,439, which are hereby incorporated by reference.

The monoorganodialkoxysiloxy endblocked organosiloxane block copolymers can also be prepared to include additional amounts of hydroxyl endblocked polydiorganosiloxanes in amounts up to 25 weight percent based on the total weight of the block copolymer. The hydroxyl endblocked polydiorganosiloxanes can be added with the monoorganotrialkoxysilane during the endblocking step of the preparation. These hydroxyl endblocked polydiorganosiloxanes are added to improve the extrusion rate when the compositions are about 100 percent solids and are to be used by forcing the composition through the orifice. The hydroxyl endblocked polydiorganosiloxanes suitable for this purpose are those having less than 50 diorganosiloxane units per molecule. The diorganosiloxanes units can include dimethylsiloxane, phenylmethylsiloxane, and diphenylsiloxane units.

The room temperature vulcanizable composition of the present invention can also contain fillers, pigments, and other additives conventionally used in siloxane compositions.

The room temperature vulcanizable compositions of the present invention are alkoxy functional organosiloxane block copolymers which are useful as dirt resistant coating compositions and as adhesives. The dirt resistant property of the cured block copolymers of the present invention is completely unexpected, since the dirt resistant property could not be predicted from previous compositions. The alkoxysiloxane block copolymers of the present invention can be used as coatings over other silicone rubber and resins to prevent dirt pick-up, especially other room temperature vulcanizable silicone rubbers. The alkoxysiloxane block copolymers adhere to the other silicone rubbers and resins with a strong bond and the surface of a coating does not pick up dirt. The alkoxysiloxane block copolymers are also useful as adhesives and coatings, especially for metals, since they are non-corrosive during curing or thereafter, since the by-produced products are alcohols instead of acidic or basic products.

The following examples are only presented for illustrative purposes and should not be construed as limiting the present invention which is properly delineated in the claims.

EXAMPLE 1

To a mixture of 17.5 pounds of a hydroxyl endblocked polydimethylsiloxane having an average of 34 dimethylsiloxane units per molecule and 56.8 pounds toluene, 3.9 pounds of methyltri(methylethylketoxime)silane was added and allowed to react for one hour at 30° C.

To the resulting monomethyldi(methylethylketoxime)- siloxy endblocked polydimethylsiloxane toluene solution, 35.4 pounds of a solution of 65.5 weight percent hydroxylated phenyl siloxane resin having 90 mol percent monophenylsiloxane units and 10 mol percent phenylmethylsiloxane units in toluene was added and the resulting mixture was heated at 80° C. for 40 minutes to produce a hydroxylated organosiloxane block copolymer having 4.5 weight percent silicon-bonded hydroxyl radicals in a toluene solution. This solution was cooled and then 11.7 pounds of methyltrimethoxysilane and 0.2 pound of tetraisopropyltitanate was added and the temperature of the solution increased to 47° C. Thereafter, 0.2 pound of normal hexylamine was added to the solution and the solution was heated to 80° C. for 30 minutes. Toluene and the by-produced methanol were removed by stripping at reduced pressure (~20 mm. Hg) to 100° C. The resulting product was a monomethyldimethoxysiloxy endblocked organosiloxane block copolymer.

The resulting monomethyldimethoxysiloxy endblocked organosiloxane block copolymer was an adhesive. The adhesion to glass and aluminum was determined. The adhesion to glass was determined by butt joints, 1 inch by 0.25 inch, and the adhesion to aluminum was determined by lap shear joints, 1 inch by 0.25 inch. The test joints were prepared by applying a light coat of the methoxy functional block copolymer to each of the adherents which were then pressed together and left undisturbed for 24 hours. After 24 hours any excess of the block copolymer was removed and then the adhesive strength was determined after 7 days at room temperature and 50% relative humidity. The adhesive strength was recorded as pounds per square inch as determined by the method ASTM-D-412-64T pulling at 2 inches per minute. The butt joints are placed together and allowed to cure whereas the lap shear joints are clamped together and then allowed to cure. The adhesive strength for glass was found to be 550 p.s.i. and the adhesive strength for aluminum was found to be 430 p.s.i. No corrosion was observed on the aluminum used in the adhesivon determination.

EXAMPLE 2

A monomethyldimethoxysiloxy endblocked organosiloxane block copolymer was prepared as described in Example 1 except the amounts of the ingredients were as follows:

14.02 parts by weight of the hydroxyl endblocked polydimethylsiloxane,
3.12 parts by weight of the methyltri(methylethylketoxime)silane,
28.36 parts by weight of the hydroxylated phenylsiloxane resin solution,
8.65 parts by weight of methyltrimethoxysilane,
0.16 part by weight of titanium acetylacetonate instead of the tetraisopropyltitanate,
0.16 part by weight of normal hexylamine and
45.51 parts by weight of toluene.

The monomethyldimethoxysiloxy endblocked organosiloxane block copolymer obtained had the following physical properties after curing for 7 days at room temperature.

The methoxy functional block copolymer had a skin over time of 10 minutes and a tack free time of 45 minutes. The cured methoxy functional block copolymer had a durometer of 90 on the Shore A scale. The tensile strength was 780 p.s.i. at break and the elongation of 60 percent as determined by ASTM-D-412-64T procedure pulling at 2 inches per minute. The tear strength was 44 p.p.i. as determined by ASTM-D-624-54, Die B, procedure by pulling at 2 inches per minute.

EXAMPLE 3

(A) To a mixture of 426.8 g. of a hydroxyl endblocked polydimethylsiloxane having an average of 34 dimethylsiloxane units per molecule and 963.5 g. of reagent grade toluene, 95.1 g. of methyltri(methylethylketoxime)silane was added and allowed to react for one hour at 25° C. To the resulting monomethyldi(methylethylketoxime) siloxy endblocked polydimethylsiloxane toluene solution, 1012.8 g. of a solution of 56.1 weight percent hydroxylated phenylsiloxane resin having 90 mol percent monophenylsiloxane units and 10 mol percent phenylmethylsiloxane units in toluene was added and the resulting mixture was allowed to react over a 1.5 hour period while the temperature increased from 25° C. to 81° C. to produce a hydroxylated organosiloxane block copolymer having 3 weight percent silicon-bonded hydroxyl radicals in a toluene solution. This solution was cooled to room temperature and 450.2 g. of methyltrimethoxysilane and 6.25 g. of tetraisopropyltitanate in 10 g. of toluene was added and the mixture was allowed to react for 30 minutes and increase in temperature to 51° C. Thereafter, 6.25 g. of normal hexylamine in 10 g. of toluene was added to this solution and the solution was heated to 95° C. for one hour and 45 minutes removing volatile materials such as the by-produced methanol. The resulting solution was then vacuum stripped to 125° C. The resulting product was a monomethyldimethoxysiloxy endblocked organosiloxane block copolymer. To the monomethyldimethoxysiloxy endblocked organosiloxane block copolymer, 12.6 g. of tetraisopropyltitanate was added and the composition was sealed in tubes to prevent contact with moisture. The composition cures upon exposure to moisture but is entirely stable in the anhydrous condition.

(B) A monomethyldimethoxysiloxy endblocked organosiloxane block copolymer was prepared as described above except, instead of 1012.8 g. of the hydroxylated phenylsiloxane resin only 760.8 g. was used.

(C) For comparative purposes a standard commercially available room temperature vulcanizable silicone sealant curing through methoxy functionality was used.

(D) The dirt pick-up and dirt retention was determined by coating an aluminum panel and exposing the coated panel after the compositions cure to an industrial outdoor atmosphere. The panels coated with monomethyldimethoxysiloxy endblocked organosiloxane block copolymers of (A) and (B) both had >100 gloss initially and after 4 months exposure as determined by a 90° angle gloss determination using a glossometer. The sealant of (C) had an initial gloss of 60 and only a gloss of 24 after 4 months exposure. The sealant of (C) retained the dirt and did not wash clean.

EXAMPLE 4

A monomethyldimethoxysiloxy endblocked organosiloxane block copolymer was prepared as described in Example 3, except the ingredients were as follows:

35.9 parts by weight of the hydroxyl endblocked polydimethylsiloxane having an average of 34 dimethylsiloxane units per molecule,
8.0 parts by weight methyltri(methylethylketoxime)silane,
35.9 parts by weight of a hydroxylated phenylsiloxane resin having 90 mol percent monophenylsiloxane units and 10 mol percent diphenylsiloxane units,
20.2 parts by weight methyltrimethoxysilane,
0.5 part by weight tetraisopropyltitanate,
0.5 part by weight normal hexylamine, and to the final composition
0.5 part by weight tetrabutyltitanate.

The resulting composition was used to coat over a commercially available silicone rubber which was coated on a standard 100 watt incandescent light bulb. The light bulb was placed in a high dirt pick-up area for 9 days with the following results. A commercially available silicone rubber coating was used to provide a bulb which is safe when shattered.

LOSS OF LIGHT TRANSMISSION (PERCENT)

| Exposure | Uncoated bulb | Silicone rubber coated bulb | Another competitive silicone rubber coated bulb | Silicone rubber coated bulb with overcoat |
| --- | --- | --- | --- | --- |
| None | 0.0 | 0.5 | 5.0 | 0.5 |
| After 9 days | 0.6 | 3.6 | 5.3 | 1.2 |
| Total | 0.6 | 4.1 | 10.3 | 1.7 |

The incandescent light bulbs have a useful shatterproof life of up to 1000 hours when coated with the commercially available silicone rubber as determined by a test in which the bulb is on for 23 hours and off for one hour. The use of the monomethyldimethoxysiloxy endblocked organosiloxane block copolymer increases the useful shatterproof life of the bulb to 1300 hours.

EXAMPLE 5

Examples 3(A) and (B), were repeated except that with the methyltrimethoxysilane, 250.0 g. of a hydroxyl endblocked polydiorganosiloxane was added therewith. The hydroxyl endblocked polydiorganosiloxane had a viscosity of about 3 cs. at 25° C. and had dimethylsiloxane units and diphenylsiloxane units. When the same dirt resistant test described in Example 3 was performed, the results were the same.

EXAMPLE 6

When 24 mols of a hydroxyl endblocked polydiorganosiloxane having an average of 350 siloxane units per molecule and having 80 mol percent dimethylsiloxane units, 10 mol percent phenylmethylsiloxane units and 10 mol percent monomethylsiloxane units is mixed with 0.15 mol of monovinyltri(methylethylketoxime)silane and the mixture is allowed to agitate for one hour, a monovinyldi(methylethylketoxime)siloxy endblocked polydiorganosiloxane is obtained. To this product 67.85 mols of an organosiloxane resin having 55 mols of monophenylsiloxane units, 5 mols of monopropylsiloxane units and 7.85 mols of methylnaphthylsiloxane units is added and the resulting mixture is agitated for one hour at 75° C. whereby a hydroxylated organosiloxane block copolymer is obtained. To the hydroxylated organosiloxane block copolymer, 8 mols of a mixture of monoorganotrialkoxysilanes and 1.0 weight percent tetra-n-butyltitanate are added and the mixture is agitated for 15 minutes. To this mixture is then added 1.5 weight percent aniline and the mixture is heated for 45 minutes at 100° C. The resulting mixture is then stripped to 100° C. at 5 mm. of Hg. The mixture of monoorganotrialkoxysilane is composed of 4 mols of vinyltriethoxysilane and 4 mols of amyltripropoxysilane. The resulting alkoxy functional organosiloxane block copolymer has adhesive properties and is a film former.

EXAMPLE 7

When 84 mols of a hydroxyl endblocked polydimethylsiloxane having an average of 50 dimethylsiloxane units per molecule is mixed with 3.36 mols of monoethyltriacetoxysilane and the mixture is allowed to agitate for one hour at 70° C., a monoethyldiacetoxysiloxy endblocked polydimethylsiloxane is obtained. To this product, 7.64 mols of hydroxylated monophenylsiloxane resin having 10 weight percent hydroxyl radicals is added and the mixture is agitated for 40 minutes at 85° C. whereby a hydroxylated organosiloxane block copolymer is obtained. To the hydroxylated organosiloxane block copolymer, 5 mols of monoisopropyltributoxysilane and 0.5 weight percent tetraisopropyltitanate are added and the mixture is agitated for one hour at 40° C. before 0.5 weight percent normal hexylamine is added and the mixture then heated at 60° C. for 30 minutes. The resulting mixture is vacuum stripped to 100° C. at 25 mm. of Hg. to remove the volatiles. The resulting butoxy functional organosiloxane block copolymer is a coating composition curable at room temperature by exposure to moisture in the presence of tetrabutyltitanate.

EXAMPLE 8

When 30 mols of a hydroxyl endblocked polydiorganosiloxane having 98 mol percent dimethylsiloxane units and 2 mol percent phenylmethylsiloxane units and having an average of 15 diorganosiloxane units per molecule is mixed with 4 mols of monoxenyltrichlorosilane and agitated for 20 minutes at room temperature, a monoxenyldichlorosiloxy endblocked polydiorganosiloxane is obtained. To this product, 39 mols of a hydroxylated organosiloxane resin having 30 mols of monophenylsiloxane units and 9 mols of monotolylsiloxane units is added and the mixture is agitated for 4 hours at 120° C. whereby a hydroxylated organosiloxane block copolymer is obtained. To this hydroxylated organosiloxane block copolymer, 27 mols of monomethyltriethoxysilane and 2.5 weight percent tetraisopropyltitanate are added and the mixture is agitated at 30° C. for 5 minutes and then 1.0 weight percent normal hexylamine is added and the mixture is heated for one hour at 80° C. The resulting mixture is stripped to 120° C. at 15 mm. of Hg. The resulting ethoxy functional organosiloxane block copolymer is a coating composition curable at room temperature by exposure to moisture and stable under anhydrous conditions.

EXAMPLE 9

When 48 mols of a hydroxyl endblocked polydimethylsiloxane having an average of 115 dimethylsiloxane units per molecule is mixed with 0.84 mol of monophenyltriacetoxysilane and agitated for 30 minute at 60° C., a monophenyldiacetoxysiloxy endblocked polydimethylsiloxane is obtained. To this product, 49.16 mols of a hydroxylated organosiloxane resin having 40 mols of monophenylsiloxane units and 9.16 mols of monopropylsiloxane units is added and the mixture agitated for one hour at 70° C. whereby a hydroxylated organosiloxane block copolymer is obtained. To the hydroxylated organosiloxane block copolymer, 2 mols of monomethyltripentoxysilane and 1.0 weight percent tetraisopropyltitanate are added and the mixture is agitated for one hour at room temperature for 25 minutes and then 1.0 weight percent normal hexylamine is added and the mixture is heated to 70° C. for 45 minutes. The resulting mixture is stripped to 115° C. at 4 mm. of Hg to provide a pentoxy functional organosiloxane block copolymer which is a coating composition.

That which is claimed is:

1. A room temperature vulcanizable composition stable in the absence of moisture and curable upon exposure to moisture consisting essentially of an alkoxy functional organosiloxane block copolymer consisting essentially of (A) 24 to 84 inclusive mol percent of diorganosiloxane units wherein the diorganosiloxane units are bonded through silicon-oxygen-silicon bonds forming a polydiorganosiloxane block having an average of from 15 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 68 inclusive mol percent organosiloxane units having an average formula

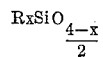

$$R_xSiO_{\frac{4-x}{2}}$$

where $x$ has a value of from 1 to 1.3 inclusive and R is an organic group selected from the group consisting of aryl radicals, methyl radicals, vinyl radicals, ethyl radicals and propyl radicals, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 2 to 27 inclusive mol percent of endblocking alkoxysiloxane units of the formula

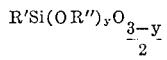

where y has an average value from 1.8 to 2 inclusive, R' is an organic radical selected from the group consisting of alkyl radicals having from 1 to 5 inclusive carbon atoms, phenyl radicals and vinyl radicals, and each R″ is an alkyl radical of from 1 to 5 inclusive carbon atoms, the mol percentages of (A), (B) and (C) being based on the total number of siloxane units in the organosiloxane block copolymer.

2. The room temperature vulcanizable composition of claim 1 wherein the diorganosiloxane units of (A) are present in an amount of from 37 to 65 inclusive mol percent, the organosiloxane units of (B) are present in an amount of from 25 to 52 inclusive mol percent and the endblocking alkoxysiloxane units of (C) are present in an amount of from 2 to 25 inclusive mol percent.

3. The room temperature vulcanizable composition of claim 1 in which all the diorganosiloxane units are dimethylsiloxane units, R is aryl, and each R' and R″ is methyl.

4. The room temperature vulcanizable composition of claim 1 in which there is also present additionally up to 25 weight percent polydiorganosiloxane segments having up to 50 diorganosiloxane units per segment and the diorganosiloxane units being selected from the group consisting of dimethylsiloxane units, phenylmethylsiloxane units and diphenylsiloxane units.

5. The room temperature vulcanizable composition of claim 1 in which there is also present a catalyst consisting essentially of an organotitanate and an organoamine.

6. The composition of claim 5 cured by exposure to moisture.

References Cited
UNITED STATES PATENTS

| | | | |
|---|---|---|---|
| 3,294,718 | 12/1966 | Antonen | 260—18 |
| 3,294,739 | 12/1966 | Weyenberg | 260—46.5 |
| 3,334,067 | 8/1967 | Weyenberg | 260—46.5 |
| 3,344,104 | 9/1967 | Hyde | 260—32.8 |
| 3,436,439 | 4/1969 | Woods | 260—825 |
| 3,499,859 | 3/1970 | Matherly | 260—37 |
| 3,504,051 | 3/1970 | McVannel | 260—825 |

DONALD E. CZAJA, Primary Examiner

M. I. MARQUIS, Assistant Examiner

U.S. Cl. X.R.

117—124 F, 135.1 R; 156—329 R; 161—193 R, 207 R; 260—37 SB, 46.5 G, 825 R